Patented Dec. 22, 1936

2,065,157

UNITED STATES PATENT OFFICE 2,065,157

MATERIAL FOR ARC WELDING

Wilmer E. Stine, Cleveland, Ohio, assignor to The Lincoln Electric Company, Cleveland, Ohio, a corporation of Ohio No Drawing. Application January 20, 1934, Serial No. 707,544

9 Claims. (Cl. 148—24)

This invention relates as indicated to arc welding, and more particularly to a process of arc welding wherein a quantity of finely divided material for various purposes is placed on the seam ahead of the arc. The principles of the present invention are applicable to carbon as well as metallic arc welding, although for certain reasons hereinafter more fully explained, the present invention is perhaps most applicable to the carbon arc process.

It is among the objects of this invention to provide a process of electric arc welding wherein an arc is established between the work and a suitable electrode and such work and electrode moved relatively so that the latter will follow the line to be welded and depositing on the work in advance of the arc a sufficient quantity of finely divided material so that the resultant weld will be a sound structure free from objectionable porosity and inclusions. It is a further object of this invention to provide a particular type of material for use in the above-described process to the accomplishment of the above-stated ends. It is a further object of this invention to provide material of the character described which when deposited on the work in advance of the arc will not be blown away by the disturbance created by the arc, but will adhere to the work and in sufficient quantity in order that the desirable ends may be attained. Other objects of my invention will appear as the description proceeds.

To the accomplishment of the foregoing and related ends, the invention, then, comprises the means hereinafter fully described and particularly pointed out in the claims, the following description setting forth in detail certain illustrative examples of the invention, these being indicative however, of but a few of the various ways in which the principle of the invention may be employed.

The process comprising this invention consists as previously indicated, in welding either with a carbon or metallic arc and protecting the weld metal from absorption of gases from the surrounding or ambient atmosphere and deterioration such as by oxidation and inclusions by placing upon the seam a considerable quantity of finely divided material arranged as a windrow in line with the travel of the arc so that the arc may in effect plough through such windrow during the welding operation.

The material employed as an adjunct in the above-described process, or more particularly the components of such material, have four definite functions to be performed, which will first be enumerated so that the reason for the particular composition of the material may best be understood.

As the arc moves along the work a considerable amount of disturbance is created thereby, particularly due to the setting up of convection currents resulting from the heat generated in the arc. Some means must, therefore, be provided whereby the finely divided material placed on the seam ahead of the arc will not be blown away as a result of such arc disturbance. Any material satisfactory for this purpose must, therefore, be of such a nature that when once deposited upon the work it will properly adhere thereto until the welding operation has been completed, i. e., until such material has been converted into fluid or plastic slag in the immediate vicinity of the arc or consumed or volatilized.

In order that the resultant weld will not be detrimentally porous, the material employed in accordance with this invention should, when welding certain forms of steel, contain some ingredients which function in the same capacity as the so-called "killing" ingredients usually added to the ladle during the course of manufacture of the steel.

The material employed in accordance with my invention must, when welding certain types of steel, also advantageously contain sufficient quantities of deoxidizers, i. e., ingredients which combine with the metallic oxides in the pool of molten metal, to convert the same into such state having a sufficiently low specific gravity so that they may float to the top of the pool and not be included in the weld when the metal solidifies.

The slag resulting from the molten ingredients of the material must form a protective slag over the molten metal of satisfactory consistency to protect the molten metal from absorbing gases from the surrounding atmosphere.

The ingredients which are essential to accomplish the foregoing desirable results sometimes and usually have a disturbing effect upon the arc. The material must, therefore, include an ingredient which may be broadly defined as an arc stabilizing component.

In the light of the foregoing, I give below a table showing the range of percentages within which the foregoing components of the material may be present in order to secure desirable results.

|  | Per cent |
|---|---|
| Low melting point materials | 5 to 50 |
| Metallic oxides | 20 to 75 |
| Deoxidizers (organic) | up to 15 |
| Deoxidizers (metallic) | up to 50 |
| Arc stabilizing materials | 5 to 25 |

A more detailed description of the above-identified components will now be given with particular reference to the specific materials which may be employed as such components.

The low melting point materials are used for the following purposes:

When the finely divided material is deposited on the work ahead of the arc, some expedient must be employed to secure such material against displacement due to the disturbance created by the arc. This is accomplished by the employment of the low melting point material component which is of such a nature that an appreciable amount of the total composition has a sufficiently low melting point so that it will be reduced to a substantially fluid or plastic state for an appreciable distance in advance of the arc, i. e., for a distance ranging beyond the disturbance created by the arc. As this material melts, the surface is a binder for the remaining materials having a higher melting point so that the total mass may be held in proper position until the arc has passed therethrough.

Materials for this low melting point component of the total composition should have a melting point between 50° C. and 400° C., and should be present in the total composition in amounts from 5 per cent to 50 per cent, by weight. In a preferred range, this component may be present in amounts from 15 per cent to 35 per cent, and in a specific range this component may be present in amounts from 20 per cent to 30 per cent.

Boric acid is the preferred material for this low melting point component. There are several substitutes, however, which may be employed at least in part in place of the boric acid. Such substitutes are sugar, gums, rosins, waxes or other boron compounds.

Boric acid is the preferred material for this purpose because at elevated temperature it breaks down, yielding an oxide of boron which is a satisfactory solvent for the other metallic oxides, which composition yields a satisfactory protective slag for the molten metal in the pool.

The metallic oxides which are an essential ingredient in a satisfactory slag for the purpose of reducing or eliminating entirely the porosity of the resultant weld metal are, as previously indicated, preferably present in amounts from 20 per cent to 75 per cent, although a preferred range for these materials is from about 35 per cent to about 60 per cent. As examples of the metallic oxides which may be employed, I may name manganese oxides and iron oxides. Each of these should not be present in amounts in excess of 50 per cent, and both of these may be present in combination within the above-defined limits. In place of the manganese oxides, I may employ manganese ores, pyrolusite, rhodochrosite, and in place of the iron oxides, I may employ mill scale, iron ores, umbers and siennas.

The component including the deoxidizers may be further subdivided into organic deoxidizers and metallic deoxidizers. The organic deoxidizers may be present in amounts up to about 15 per cent and as a preferred example of an organic deoxidizer I may name starch, although I may substitute for starch suitable quantities of dextrine, wheat flour, carbohydrates and/or cellulosic materials.

The metallic deoxidizers may be present in amounts up to 50 per cent, and as preferred metallic deoxidizers I may name ferro-manganese, which may be present in amounts up to 50 per cent, and ferro-silicon, which may be present in amounts up to 10 per cent. In addition to the foregoing metallic deoxidizers I may employ ferro-aluminum, ferro-vanadium, ferro-titanium, manganese-titanium, and/or aluminum. Inasmuch as the foregoing materials employed for the purposes named, and particularly materials such as boric acid, tend to cause the arc to behave in an erratic manner, i. e., tend to cause a "wild" arc, some suitable arc stabilizing material must be used to counteract this effect. The arc stabilizing materials presently to be named may be present in amounts from 5 per cent to 25 per cent. A particular arc stabilizing material which has been found very satisfactory is orthoclase (potassium feldspar). Other compounds of potassium, sodium, barium, lithium and caesium have also been found to be very satisfactory. Sodium silicate may also be employed in amounts up to 25 per cent as an arc stabilizing and/or slag-forming material.

The foregoing materials comprising the components of the windrow of finely divided material placed on the seam ahead of the arc, are suitably ground and mixed so as to produce a homogeneous mixture which may be deposited on the work in the manner hereinafter more fully explained. There are several requirements of a material for the above-defined purposes which it may be well to enumerate at this point. The melting point of the final slag resulting from the mixture must be less than 1100° C., i. e., less than the temperature at which the metal in the pool solidifies, so that the slag will occur as a molten film over the pool of molten metal and protect the seam for oxidation and gases capable of being absorbed during solidification. The resultant slag must also have a specific gravity considerably lower than that of the molten metal in the pool, so that it may float to the top and not be included in the molten metal which upon solidification forms the weld. The slag in the molten form must have a low surface tension so as to thoroughly "wet" the surface of the molten metal. For example, boric acid either with or without dissolved metallic oxides, has this characteristic. The slag or flux must have such characteristics that it will not cause any serious disturbance of the arc as the arc passes over or through it. The slag must be of such chemical composition as not to deleteriously react with the metal at the high temperature encountered in the arc, and so that inferior physical properties will not be imparted to the weld metal. For this reason a slag made up largely of boric acid, manganese oxide and/or iron oxide has been found very satisfactory. Furthermore, the slag, after cooling and solidification, should be readily removable from the weld.

All of the foregoing requirements are fully met by the previously described composition.

In practicing the process comprising this invention, the above-described material may be deposited by hand on the work along the line to be welded or from a suitable hopper and by means of any convenient feeding mechanism carried by and traveling along with the apparatus which supports the welding electrode and presents the same in arcing relation to the work. The material will be deposited in the windrow to a thickness of approximately one-eighth inch to one inch so that one pound of the above-defined composition may form a windrow of from about 5 to 15 feet in length. Any suitable means may, of course, be provided in conjunction with the feeding and depositing means for the material so as to properly shape and confine the windrow in advance of the arc.

Due to the fact that the addition of this material to the arc may affect the arc voltage, it is within the contemplation of this invention to regulate the rate of feed of the material by means functionally responsive to variations in characteristics of the arc such as the voltage and current.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I, therefore, particularly point out and distinctly claim as my invention:—

1. As a composition of matter for use in arc welding in the form of a layer deposited on the work in advance of the arc, a mixture of finely divided materials comprising about 50% to about 95% slag-forming and arc-stabilizing materials commonly used in arc welding and about 5% to about 50% of an agglutinate having a melting point between 50° C. and 400° C.

2. As a composition of matter for use in arc welding in the form of a layer deposited on the work in advance of the arc, a mixture of finely divided materials comprising about 65% to about 85% slag-forming and arc-stabilizing materials commonly used in arc welding and about 15% to about 35% of an agglutinate having a melting point between 50° C. and 400° C.

3. As a composition of matter for use in arc welding in the form of a layer deposited on the work in advance of the arc, a mixture of finely divided materials comprising about 70% to about 80% slag-forming and arc-stabilizing materials commonly used in arc welding and about 20% to about 30% of an agglutinate having a melting point between 50° C. and 400° C.

4. As a composition of matter for use in arc welding in the form of a layer deposited on the work in advance of the arc, a mixture of finely divided materials comprising about 50% to 95% slag-forming and arc-stabilizing materials commonly used in arc welding and about 5% to about 50% of sugar to serve as an agglutinate for the remainder of said materials.

5. As a composition of matter for use in arc welding in the form of a layer deposited on the work in advance of the arc, a mixture of finely divided materials comprising about 50% to 95% slag-forming and arc-stabilizing materials and about 5% to about 50% of boric acid to serve as an agglutinate for the remainder of said materials.

6. A material for use in arc welding in the form of a layer deposited on the work in advance of the arc including the following:—

| | Parts by weight |
|---|---|
| An agglutinate having a melting point of 50° C. to 400° C. | 5% to 50% |
| Metallic oxides | 20% to 75% |
| Arc stabilizing material | 5% to 25% |

7. A material for use in arc welding in the form of a layer deposited on the work in advance of the arc including the following:—

| | Parts by weight |
|---|---|
| An agglutinate having a melting point of 50° C. to 400° C. | 15% to 35% |
| Metallic oxides | 20% to 75% |
| Arc stabilizing material | 5% to 25% |

8. A material for use in arc welding in the form of a layer deposited on the work in advance of the arc including the following:—

| | Parts by weight |
|---|---|
| An agglutinate having a melting point of 50° C. to 400° C. | 20% to 30% |
| Metallic oxides | 35% to 75% |
| Arc stabilizing material | 5% to 25% |

9. A material for use in arc welding in the form of a layer deposited on the work in advance of the arc including the following:—

| | Parts by weight |
|---|---|
| An agglutinate having a melting point of 50° C. to 400° C. | 5% to 50% |
| Metallic oxides | 20% to 75% |
| Organic deoxidizers | An effective amount up to 15% |
| Metallic deoxidizers | An effective amount up to 50% |
| Arc stabilizing material | 5% to 25% |

WILMER E. STINE.